(12) United States Patent
Guo et al.

(10) Patent No.: US 8,411,039 B2
(45) Date of Patent: Apr. 2, 2013

(54) COMPUTER KEYBOARD

(75) Inventors: Yan-Liang Guo, Taipei (TW);
Ching-Hui Chen, Taipei County (TW);
Yuan-Yuan Lee, Tainan (TW)

(73) Assignees: Silitek Electronic (Guangzhou) Co., Ltd., Guangzhou (CN); Lite-On Technology Corporation, Taipei (TW)

( * ) Notice: Subject to any disclaimer, the term of this patent is extended or adjusted under 35 U.S.C. 154(b) by 753 days.

(21) Appl. No.: 12/366,601

(22) Filed: Feb. 5, 2009

(65) Prior Publication Data
US 2010/0149101 A1 Jun. 17, 2010

(30) Foreign Application Priority Data

Dec. 13, 2008 (CN) .......................... 2008 1 0220111

(51) Int. Cl.
*G06F 3/02* (2006.01)
*G06F 3/041* (2006.01)
*H03K 17/94* (2006.01)

(52) U.S. Cl. ............ 345/172; 345/168; 345/173; 341/22

(58) Field of Classification Search .................... 345/30, 345/33, 41–42, 48, 50–51, 53–55, 76, 84, 345/87–90, 92, 156, 168, 172–174, 184; 341/20–23
See application file for complete search history.

(56) References Cited

U.S. PATENT DOCUMENTS 5,181,029 A * 1/1993 Kim ................................. 341/20
5,892,503 A * 4/1999 Kim ............................... 345/168
2002/0063691 A1 * 5/2002 Rogers et al. ................. 345/168
2002/0171628 A1 * 11/2002 Tani et al. ..................... 345/156
2004/0140956 A1 * 7/2004 Kushler et al. ................ 345/168
2005/0062722 A1 * 3/2005 Hsieh ............................ 345/168
2007/0229471 A1 * 10/2007 Kim et al. ..................... 345/173
2008/0259037 A1 * 10/2008 Kim ............................... 345/168
2009/0179867 A1 * 7/2009 Shim et al. .................... 345/173

* cited by examiner

*Primary Examiner* — Lun-Yi Lao
*Assistant Examiner* — Jarurat Suteerawongsa
(74) *Attorney, Agent, or Firm* — Li & Cai Intellectual Property (USA) Office

(57) ABSTRACT

A computer keyboard comprises a touch control display panel comprising a display unit, a plurality of touch sensing units, and a display control unit. The display unit is utilized for displaying icons of control keys. The touch sensing units are utilized for sensing pressed status of the control keys, and transmitting pressure sensing signals and position signals to a host. The display control unit is utilized for receiving icons of the control keys from the host, and making the display unit display icons of the control keys. When an external force presses one of the control keys of the touch control display panel, a specific touch sensing unit senses pressed status of a position corresponding to the pressed control key, and make the host start or terminate an executable program according to link of the executable program corresponding to the pressed control key.

9 Claims, 2 Drawing Sheets

COMPUTER KEYBOARD

BACKGROUND OF THE INVENTION

1. Field of the Invention

The present invention relates to a computer keyboard, and more particularly, to a computer keyboard having a touch control display panel.

2. Description of the Prior Art

In command to start executable programs in a computer more conveniently during using the computer, people often set hot keys linked to the executable programs as a way for starting the executable programs. In Microsoft Windows host, icons of the fast keys are placed in folders of the "desktop". During the computer operation, the desktop displayed on the display panel is easy for people to click the hot keys to link the corresponding programs.

As another important part of the computer, the keyboard is utilized for inputting various commands to the computer system. The conventional keyboard is made up by mechanical control key area, and there are fixed character keys in the mechanical control key area. In this way, users can press a specific character key to send command of clicking a hot key, and execute a corresponding program practically. For example, users can press a character key having a mail pattern to execute an e-mail program. However, the positions and functions of the character keys on the keyboard are fixed, and users can not set the positions and functions of the character keys on the keyboard according to their requirements, but only can input command via fixed character keys. The functions of the keyboard are limited.

Thus, it is necessary to provide a computer keyboard capable of adding control keys according to users' requirements to solve the above problem.

SUMMARY OF THE INVENTION

It is therefore one of the objectives of the present invention to provide a computer keyboard having a touch control display panel to display various editable electronic information, so as to realize independent adding or changing of keyboard control keys and increase functions for the keyboard.

In accordance with an embodiment of the present invention, a computer keyboard is disclosed. The computer keyboard comprises:

a mechanical control key area, coupled to a host, having a plurality of mechanical control keys for transmitting a corresponding control signal to the host when one of the mechanical control keys is pressed; and a touch control display panel, coupled to the host, comprising:

a display unit, for displaying icons of a plurality of control keys, text, or patterns;

a plurality of touch sensing units, coupled to the host and arranged to the control keys, text, or patterns on the display unit, for sensing pressed status of corresponding positions of the control keys, text, or patterns on the display unit, and transmitting corresponding control signals to the host; and a display control unit, electrically connected to the display unit and the host, for receiving the icons of the control keys, the text, or the patterns from the host, and making the display unit display the icons of the control keys, the text, or the patterns;

wherein when an external force presses one of the control keys, text, or patterns on the touch control display panel, a specific touch sensing unit senses pressed status of a position corresponding to the pressed control key, and makes the host start or terminate an executable program according to a link of the executable program corresponding to the pressed control key.

In an embodiment of the present invention, the computer keyboard further comprises a plurality of function modules, wherein the function modules are timing modules, temperature sensing modules, or humidity sensing modules. The display unit comprises a first display unit and a second display unit. The first display unit is electrically connected to the display control unit and the host, and for displaying the control keys. The second display unit is electrically connected to the display control unit and the function modules, and for displaying measuring values outputted by the function modules.

In the present invention, the touch sensing units are resistor type sensing units or capacitor type sensing units. The touch sensing panel is one of Twisted Nematic Liquid crystal display (TN-LCD), Thin Film Transistor Display (TFT), Organic Light Emitting Display (OLED), or Plasma Display Panel (PDP).

Compared with the prior art, the computer keyboard of the present invention has following advantages:

1. Capable of displaying various editable electronic information, such as control keys for hot keys, time information, temperature or humidity information. The content of the electronic information can be changed according to programs. The present invention provides a programmable display platform and increase functions for the keyboard.

2. Capable of starting or terminating various executable programs via electronic information displayed on the touch control display panel: based on links between the control keys and the executable programs in the host, people can execute programs by pressing the electronic function keys on the touch control display panel of the keyboard instead of using mouse to click corresponding hot key icon on the main display panel of the computer in the conventional way, and it is fast and more convenient for the people.

3. Since the display panel is made by touch control display panel, icons of the control keys on the display panel can start a link of related program of the host according to pressing status, and each icon of the control key can be dragged to adjust position, to make people used to changing position of each control key.

4. Capable of adding or removing control keys: according to dual-monitor display technology, when a controlled target is beyond display field of a certain monitor, it can be displayed on another monitor automatically. Thus, people can move selected hot keys from the main display panel of the computer to the touch control display panel of the keyboard in a dragging way. Users can select control keys according to requirements by themselves, to realize independent adding or changing of keyboard control keys to replace the conventional un-changeable mechanical control keys and increase functions for the keyboard.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
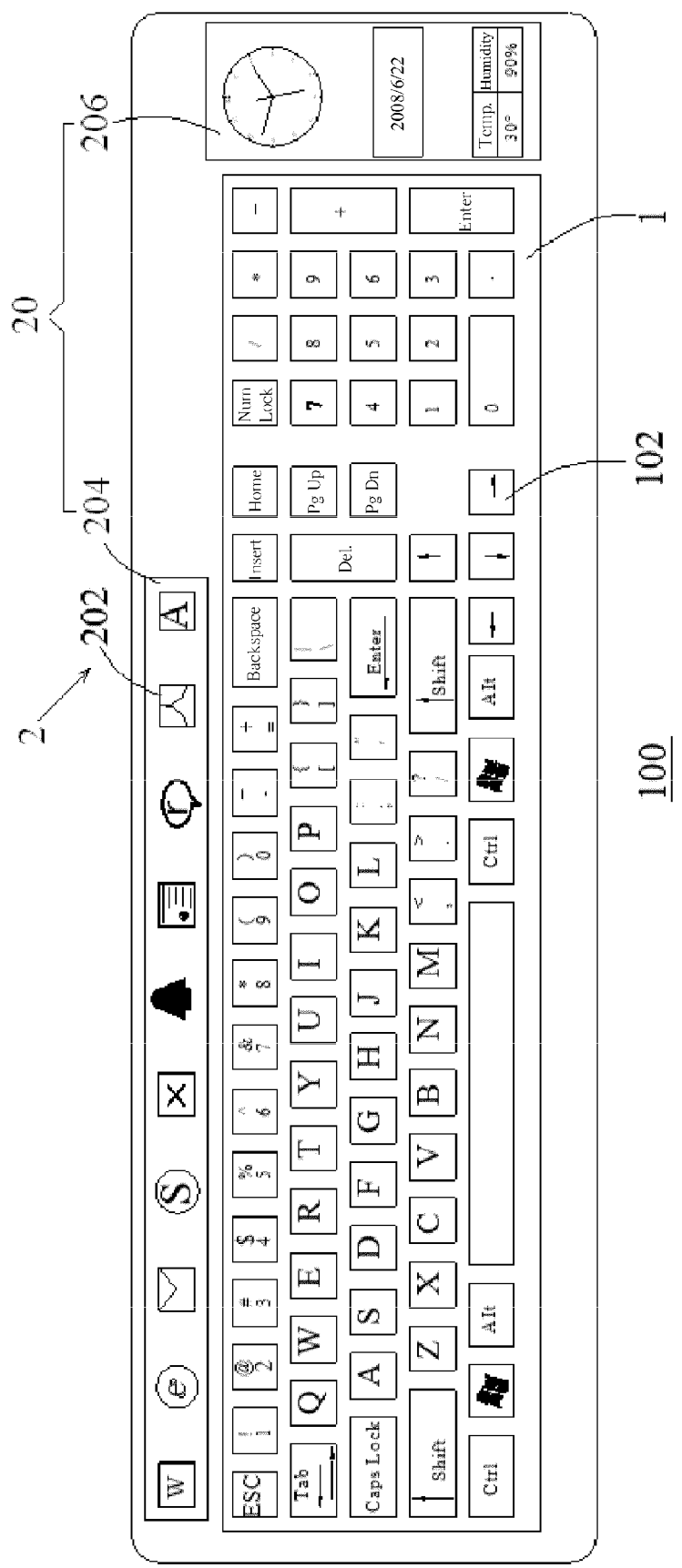
FIG. 1 shows a 3D diagram of a computer keyboard of the present invention.
Figure 2:
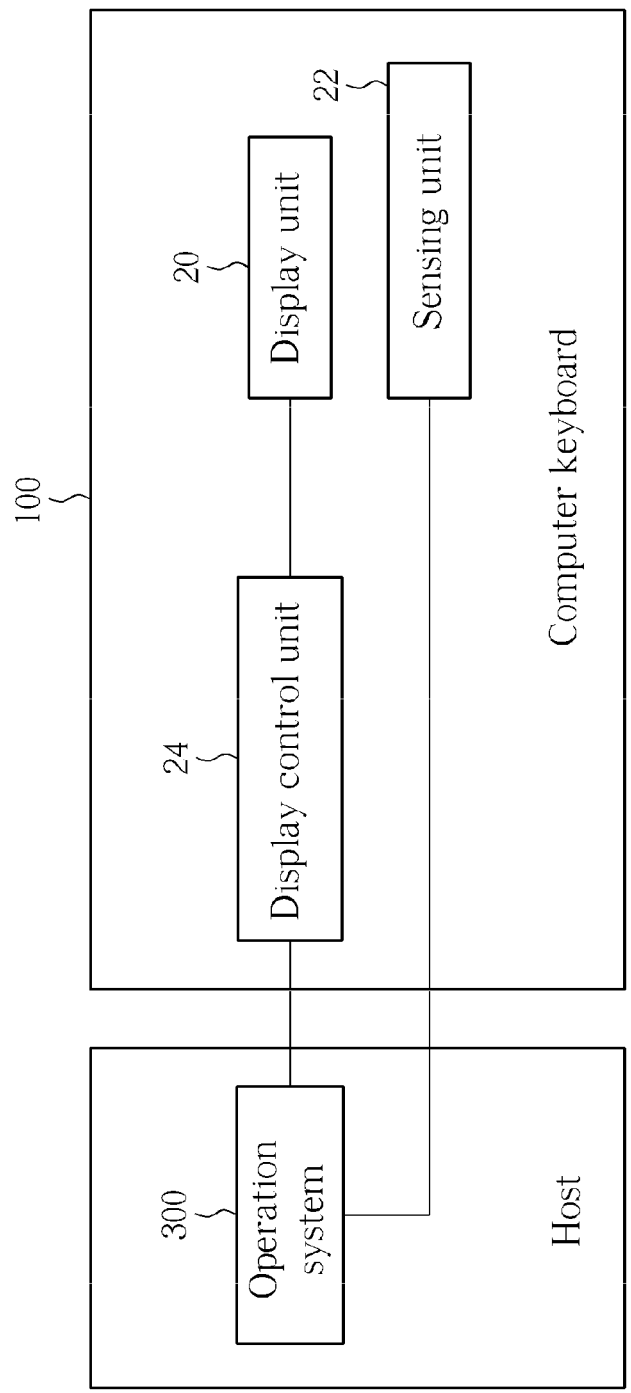
FIG. 2 shows a regional block diagram of the computer keyboard of the present invention.

Please refer to FIG. 1 and FIG. 2. In an embodiment of the present invention, a computer keyboard 100 is provided. The computer keyboard 100 comprises a mechanical control key area 1 and a touch control display panel 2 coupled to a host 300, respectively. The mechanical control key area 1 has a plurality of mechanical control keys 102. The mechanical control keys 102 can be various mechanical function keys or character keys. Users can transmit control signals to the host 300 by pressing one or a plurality of mechanical control keys 102 to execute corresponding programs or operations.

The touch control display panel 2 is a touch control LCD panel, comprising a display unit 20, a plurality of touch sensing units 22, and a display control unit 24. The display unit 20 is utilized for displaying icons of a plurality of control keys 202, text, or patterns. The touch sensing units 22 are coupled to the host 300, and utilized for sensing pressed status of corresponding positions of the control keys 202 on the display unit 20, and transmitting corresponding control signals to the host 300. The display control unit 24 and the display unit 20 are electrically connected to the host 300. The display control unit 24 is electrically connected to the display unit 20 via a flexible printed circuit board, and utilized for receiving the icons of the control keys 202, the text, or the patterns from the host 300, and transmit display driving signals to the display unit 20 to make the display unit 20 display the icons of the control keys 202, the text, or the patterns. The control keys 202 are linked to corresponding executable programs, respectively. When an external force presses an control key 202 of the touch control display panel 2, the touch sensing unit 22 senses pressed status of a position corresponding to the control key 202, and make the host 300 start or terminate an executable program according to a link of the executable program corresponding to the pressed control key 202.

In this embodiment, the display unit 20 comprises a first display unit 204 and a second display unit 206. The first display unit 204 is disposed on top of front of the computer keyboard 100 in a bar shape. The first display unit 204 can display various control keys 202. The second display unit 206 is disposed on right of front of the computer keyboard 100, for displaying other electronic information. The two display units are disposed on peripheral area of the computer keyboard 100, and the mechanical control key area 1 is disposed on central area of the computer keyboard 100 to fit with using custom of people for the conventional mechanical control key area 1. The touch control display panel 2 can be disposed on arbitrary position of the computer keyboard 100 according to shape of the computer keyboard 100 or people's requirements, and the position and size of the computer keyboard 100 are not limited.

In this embodiment, the touch sensing unit 22 is disposed below the first display unit 204, for sensing pressed status of corresponding positions of the control keys 202 on the display unit 20, and transmitting pressure sensing signals and position signals to the host 300. The position signal comprises property of an control key 202 to show the control key 202 of the position is pressed and identify the property of the control key 202, so as to make the host 300 get content of the control key 202, such as starting or terminating an executable program linked to the control key 202. The touch sensing units 22 respectively have an independent touch sensing area, and the touch sensing areas are corresponding to the control keys 202 on the positions of the touch sensing areas, respectively. The display area of each control key 202 is linked to the touch sensing area of corresponding touch sensing unit 22, and each control key 202 is controlled in the corresponding touch sensing area. The touch sensing area of each touch sensing unit 22 is not larger than the display area of the corresponding control key 202. When an external force presses a certain control key 202, the adjacent control key 202 will not be affected. A pressure threshold of the touch sensing unit 22 is set. When an external force presses the control key 202, the touch sensing unit 22 transmits the pressure sensing signal and the position signal to the host 300. If the pressure sensing signal shows that the pressure is lower than the pressure threshold, then the host 300 will not start a link of the linked program. If the pressure sensing signal shows that the pressure is equal to or higher than the pressure threshold, then the host 300 will start the link of the program linked to the pressed control key 202 to start or terminate the program according to the pressure sensing signal and the position signal.

In the present invention, the pressed control key 202 can be various function keys such as frequently used office software control keys and multi-media control keys. The office software control keys are, for example, Word hot key, Excel hot key, Outlook hot key, Internet Explorer hot key, AutoCAD hot key, Adobe Reader hot key, etc. The office software control keys are, for example, RealPlayer hot key, Media Player hot key, etc. The other frequently used software is QQ hot key, MSN hot key, Skype hot key, etc.

Since the touch control display panel 2 is an electronic display panel, types and numbers of the control keys 202 shown on the touch control display panel 2 are not limited, and can be determined according to user's preference and requirements, so as to make the keyboard become a multifunctional control platform and increase functions of the keyboard. Specifically, when the types and numbers of the control keys 202 are required to be changed, the displayed icons have to be replaced and sensing areas corresponding to the touch sensing units have to be adjusted to determine whether the control keys 202 are pressed according to pressing status of corresponding positions of the control keys 202, so that people can start a linked program by pressing the control keys 202 on the touch control display panel 2.

In the present invention, the touch control display panel 2 can be one of Twisted Nematic Liquid crystal display (TN-LCD), Thin Film Transistor Display (TFT), Organic Light Emitting Display (OLED), or Plasma Display Panel (PDP). The touch sensing units 22 are resistor type sensing units or capacitor type sensing units.

There are two implementing ways for the control keys 202. One is fixed selection type, which means that the types of the control keys are implemented by the keyboard producer, and the implemented control keys are linked to corresponding programs in the computer system. Another one is self-selection type, which means that users can implement the types of the control keys according to their requirements.

Specifically, taking the control keys 202 as computer hot keys for example, users can optionally drag fast keys only on the "desktop" to the touch control display panel 2. In other words, when the selected fast key is dragged to edge of the main display panel, the system considers that the fast key is beyond display field of the main display panel, and the computer system transmits relate information of the fast key to the display unit 20. The display unit 20 can display the dragged fast key on a predetermined position to realize switching display position of the fast key. The relate information of the fast key can comprises icon of the fast key and linking relation for specific application program of the fast key. Thus, users can arbitrarily drag fast keys on the main display panel to the touch control display panel 2 of the keyboard according to their preference and requirements, to increase control keys on the keyboard. In addition, users can further adjust position of each control key 202 on the touch control display panel 2, to realize changing of position of each control key 202.

In command to distinct different operations, it can set fast double pressing a target control key for starting a linked program via software. The way of terminating the linked program is the same as that of starting the linked program. When the program is in operating status, double pressing the target control key will terminate the linked program. The way of dragging the control key is pressing the target control key for a long time and moving it to a corresponding position. The way of deleting the control key is pressing the target control key for a long time and pressing the delete key on the keyboard to deleting the icon of the control key on the touch control display panel. In addition, pressing the target control key for a long time and an operation interface will pop out on the computer display panel, and there are various operation commands such as executing, deleting, modifying, moving left, moving right, etc. on the operation interface. The mouse can assist to click the operation commands to complete corresponding operations. Beside the dragging method for adding control keys, since the touch control display panel of the keyboard and the main display panel of the computer are both electrically connected to the host (i.e. dual-monitor system), the system considers various icons displayed on the main display panel generally. However, users can move icons to the touch control display panel of the keyboard according to their requirements. The users can press an icon of a certain hot key on the main display panel to pop out an operation interface, and move the hot key to the touch control display panel of the keyboard, so as to complete operation of adding the control key.

In a second embodiment of the invention, a plurality of function modules such as timing modules, temperature sensing modules, or humidity sensing modules can be further implemented in the computer keyboard. In this embodiment, the first display unit 204 is respectively electrically connected to the display control unit 24 and the host 300, for displaying the control keys 202. The second display unit 206 is respectively electrically connected to the display control unit 24 and the function modules, for displaying measuring values outputted by the function modules such as current time, temperature value, or humidity value. It also increase functions for the keyboard.

Those skilled in the art will readily observe that numerous modifications and alterations of the device and method may be made while retaining the teachings of the invention.

What is claimed is:

1. A computer keyboard, comprising:
a mechanical control key area, coupled to a host, having a plurality of mechanical control keys for transmitting a corresponding control signal to the host when one of the mechanical control keys is pressed;
a plurality of function modules, wherein the function modules are timing modules, temperature sensing modules, or humidity sensing modules; and
a touch control display panel, coupled to the host, comprising:
a display unit, comprising a first display unit electrically connected to a display control unit and the host, for displaying icons of a plurality of control keys, text, or patterns, wherein a screen width of the first display unit is about once through twice a width of the mechanical control key;
a second display unit, electrically connected to the display control unit and the function modules, for displaying measuring values outputted by the function modules;
a plurality of touch sensing units, coupled to the host and arranged to the control keys, text, or patterns on the first display unit, for sensing pressed status of corresponding positions of the control keys, text, or patterns on the first display unit, and transmitting corresponding control signals to the host; and
the display control unit, electrically connected to the first display unit and the host, for receiving the icons of the control keys, the text, or the patterns from the host, and making the first display unit display the icons of the control keys, the text, or the patterns;
wherein when an external force presses one of the control keys, text, or patterns on the touch control display panel, a specific touch sensing unit senses pressed status of a position corresponding to the pressed control key, and makes the host start or terminate an executable program according to a link of the executable program corresponding to the pressed control key, where the link of the executable program corresponding to the pressed control key is a linking relation for a specific application program of a fast key on a desktop of a main display panel of a computer; when the fast key on the desktop is selected and dragged to edge of the main display panel, the host transmits a relate information of the fast key to the display unit, the display unit displays the dragged fast key on a predetermined position to realize switching display position of the fast key, wherein the relate information of the fast key comprises icon of the fast key and the linking relation for the specific application program of the fast key.

2. The computer keyboard of claim 1, wherein the touch sensing units respectively have an independent touch sensing area, and the touch sensing areas are corresponding to the control keys on the positions of the touch sensing areas, respectively.

3. The computer keyboard of claim 1, wherein the display control unit is electrically connected to the display unit via a flexible printed circuit board.

4. The computer keyboard of claim 1, wherein the touch sensing units are resistor type sensing units or capacitor type sensing units.

5. The computer keyboard of claim 1, wherein the touch sensing panel is one of Twisted Nematic Liquid crystal display (TN-LCD), Thin Film Transistor Display (TFT), Organic Light Emitting Display (OLED), or Plasma Display Panel (PDP).

6. The computer keyboard of claim 1, wherein a position of each control key on the touch control display panel is able to be adjusted by a user.

7. The computer keyboard of claim 6, wherein a way of dragging the control key is pressing the target control key for a long time and moving it to a corresponding position.

8. The computer keyboard of claim 1, wherein a way of deleting the control key is pressing the target control key for a long time and pressing a delete key on the keyboard to delete the icon of the control key on the touch control display panel.

9. The computer keyboard of claim 1, wherein when the control key is pressed for a long time, an operation interface having various operation commands will pop out on the main display panel.

* * * * *